DATA PULSE DETECTION APPARATUS

Filed Jan. 27, 1966 3 Sheets-Sheet 1

INVENTOR.
HARVEY H. MCGOWEN
BY Samuel R. Genca
ATTORNEY

INVENTOR.
HARVEY H. McCOWEN
BY Samuel R. Genca
ATTORNEY

INVENTOR.
HARVEY H. MCGOWEN
BY Samuel R. Genca
ATTORNEY

United States Patent Office 3,462,693
Patented Aug. 19, 1969

3,462,693
DATA PULSE DETECTION APPARATUS

Harvey H. McCowen, Rochester, N.Y., assignor to General Dynamics Corporation, a corporation of Delaware Filed Jan. 27, 1966, Ser. No. 523,469
Int. Cl. H03k 5/00, 13/32
U.S. Cl. 328—162 8 Claims

ABSTRACT OF THE DISCLOSURE

The test apparatus measures start and end distortion of each data pulse in each character which may be transmitted. Clock pulses having half the width of the data pulses and synchronous therewith are used to reset flip flops which are respectively triggered by the leading and lagging edges of the data pulses thereby generating transitional pulses. The leading and lagging of the data pulses also trigger one-shot multivibrators thereby producing reference pulses. Exclusive OR gates, to which the outputs of the flip flops and multivibrators are applied, generate error pulses representing start or front distortion and end distortion which may exist in any of the data pulses. The error pulses may be transmitted back to the data pulse transmitting point and used to command repetition of any character which has a distorted data pulse.

The present invention relates to electronic test apparatus and particularly to test apparatus for detecting and measuring pulse distortion, by which is meant an undesired change in wave form of a pulse.

Two well-known types of pulse distortion are start or front distortion and end distortion. Start distortion occurs at the leading edge of a data pulse, while end distortion occurs at the lagging edge of the data pulse. Start distortion is characterized in that the leading edge of the data pulse occurs either before or after a prescribed instant of time. Likewise, end distortion is characterized in that the lagging edge of the data pulse occurs either before or after another prescribed instant of time.

Start and end distortion are of particular concern in the transmission of binary information, since such information comprises data pulses and spaces occurring at discrete unit time intervals to designate a particular character in a message. Each data pulse is generally referred to as a mark or a binary "1," and each space is referred to as a binary "0." Start and end distortion in the transmission of binary information can cause critical errors. For example, if end or start distortion of a data pulse occurring in one unit time interval is excessive, an ambiguity may exist in an adjacent unit time interval, since a binary "0" in the adjacent unit time interval may appear as a binary "1."

Another problem is that the binary data pulses do not always occur at the same time sequence. In other words, the pulse repetition rate varies from one character to the next character of a message.

Accordingly, it is an object of the present invention to provide an improved test apparatus for measuring pulse distortion of data pulses having variable pulse repetition rate.

It is another object of the present invention to provide an improved test apparatus for measuring start distortion and end distortion of a data pulse.

Briefly described, test apparatus for detecting and measuring start and end distortion of a data pulse in accordance with the invention is particularly adapted for use in a data communication system, wherein a plurality of data pulses may be transmitted with uniform pulse spacing and width in each character. The test apparatus comprises means for providing a plurality of clock pulses for each plurality of the data pulses. The clock pulses are synchronous with at least one of the data pulses and have a width equal to one-half the width of the transmitted data pulses. The test apparatus further includes a flip-flop responsive to each of the data pulses and each of the clock pulses for deriving a first pulse having a pulse width equal to the time interval between one of the edges of the data pulses and the trailing edge of the clock pulse occurring next succeeding that edge of the data pulse. This edge of the data pulse may be, for example, the leading or lagging edge of the data pulses. A one-shot multivibrator triggered by the same edge of the data pulses as the flip-flop produces a second pulse commencing at the time of occurrence of the edge of the data pulse, and having a width equal to the duration of the clock pulses. An exclusive OR gate is connected to the output of the flip-flop and the one-shot multivibrator. The exclusive OR gate is responsive to the first and second pulses for deriving an output indicative of the pulse distortion. The output of the exclusive OR gate may be a pulse having a pulse width equal to the distortion. The output of the exclusive OR gate may be used as a command for the retransmission of the same data pulses, since there may be an ambiguity in the transmission of the data pulses and verification may be in order.

The invention itself, both as to its organization and method of operation, as well as additional objects and advantages thereof will become more readily apparent from a reading of the following description in connection with the accompanying drawings in which.

Figures 1, 2:
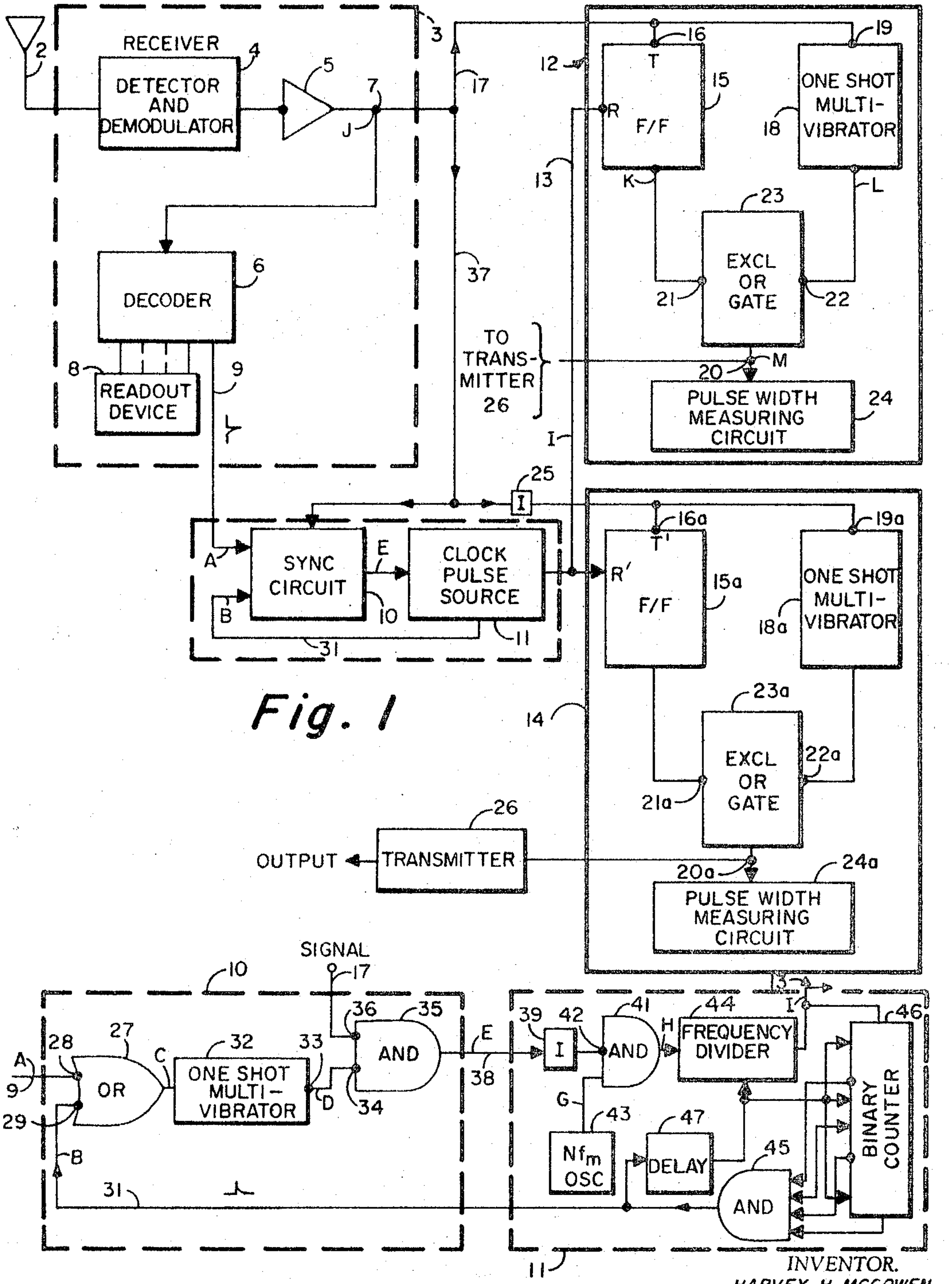
FIG. 1 is a block diagram of a data communication system including the test apparatus in accordance with the invention.
FIG. 2 illustrates a circuit block diagram of a synchronizing circuit and a clock pulse source utilized in the system of FIG. 1.
Figure 3:
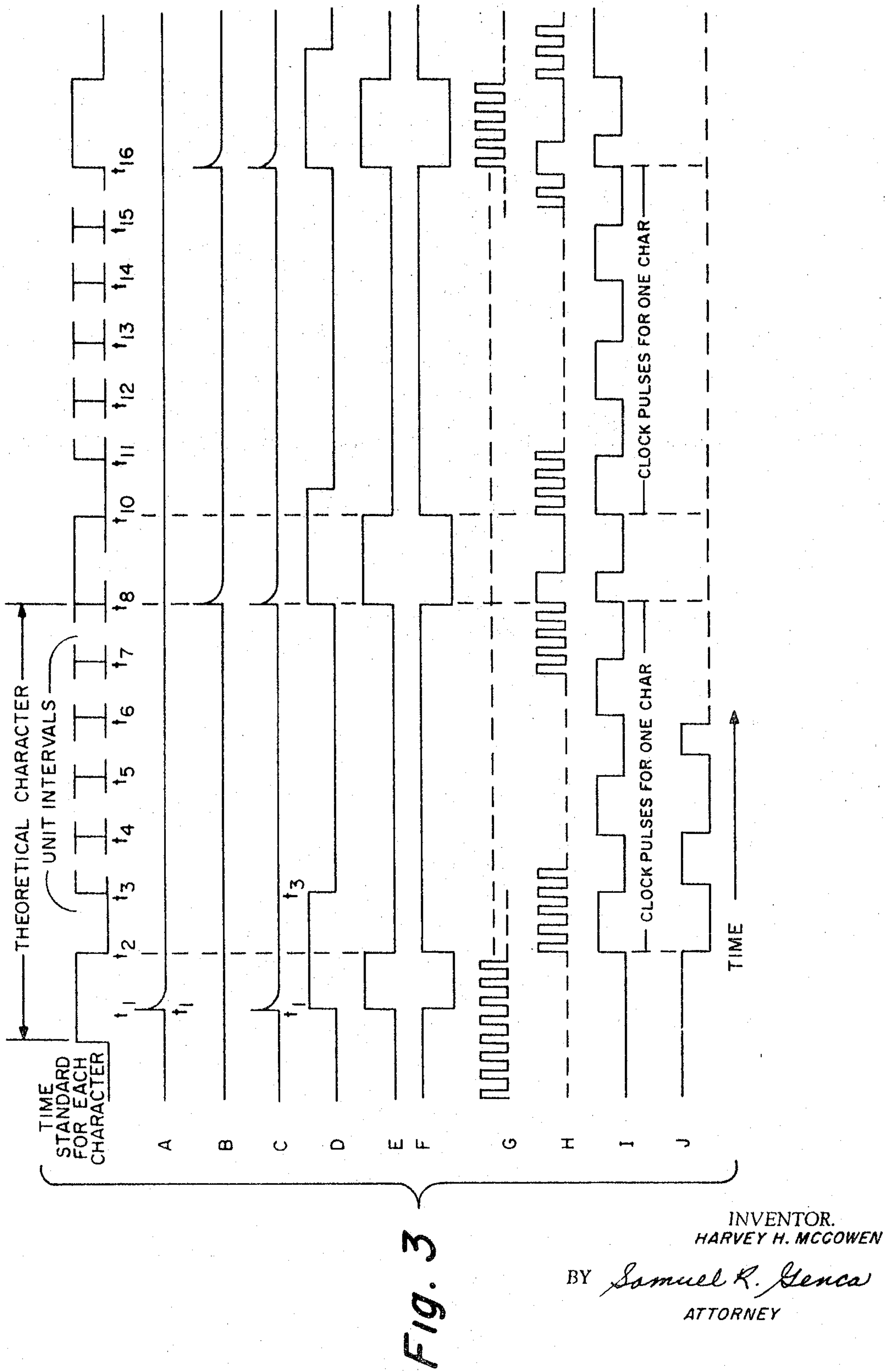
FIG. 3 is a family of pulse curves taken at various points in the diagrams of FIGS. 1 and 2 for illustrating the operation of the data communication system and the test apparatus.

Although the present invention is suited for more general applications, it is particularly adapted for use in a data communication system, part of which is shown in FIG. 1. The data communication system includes an antenna 2 and a receiver 3 connected to the antenna 2 for receiving data pulses over a radio link from a transmitter, not shown. The transmitter may transmit a message consisting of characters which include a plurality of data pulses and spaces of equal time duration in binary form wherein each of the pulses and spaces are bits of information. The bits or pulses may be transmitted in the UHF (ultra-high frequency) or the VHF (very high frequency) wherein 1,200 bits per second may be transmitted. The bits or signal pulses may also be transmitted in the MF/HF frequency bands at 75 bits per second, or in the LF frequency bands at 50 bits per second. Each character in the message may comprise a time frame having 7½ unit time intervals, five of which may be information bits which include the pulses and spaces in binary form. Each character may therefore include five bits of pulses or spaces or a combination of the pulses and spaces in binary form. A theoretical character is shown in FIG. 3.

The receiver 3 includes a detector and demodulator 4 connected between the antenna 2 and an amplifier 5 for detecting, demodulating, and amplifiying the data pulses. A decoder 6 is connected to an output terminal 7 of the amplifier 5. The decoder 6 decodes the characters consisting of the data pulses and spaces and applies the data pulses over a plurality of conductors to a readout device 8 which may be, for example, a typewriter. The decoder 6 also includes an output lead 9 connected to a synchronizing circuit 10. The output of the decoder 6 on lead 9 is a sharp spike pulse derived from a barker signal which is included at the start of each message received by the receiver 3. The barker signal signifies the start of a given message. Only one barker signal is transmitted for each message, as shown by the spike pulse along lead 9 and along line A of FIG. 3. The synchronizing circuit 10 is connected to a clock pulse source 11 which generates a train of clock pulses, as shown along line I of FIG. 3, in response to the receipt of the barker spike pulse from the decoder 6.

The clock pulse source 11 is connected to a front distortion measuring circuit 12 by way of a conductor 13 in accordance with the invention. The clock pulse source 11 is also connected to an end distortion measuring circuit 14 by conductor 13. The front distortion circuit 12 measures front timing distortion along the leading edge of a data pulse. The end distortion circuit 14 measures end timing distortion along the lagging edge of a data pulse, as will be more fully described herein.

The front distortion measuring circuit 12 includes a flip-flop 15, having a triggering input 16, connected to the output terminal 7 of the amplifier 5, by way of conductor 17. The flip-flop 15 is triggered by a positive-going edge of each data pulse. The front distortion circuit 12 also includes a one-shot multivibrator 18, having an input terminal at 19, also connected to the amplifier 5, by way of the conductor 17. The output of the flip-flop 15 and the output of the one-shot multivibrator are applied to input terminals 21 and 22 of an exclusive OR gate 23. The exclusive OR gate 23 has an output at 20 only when the time duration between a pulse from the flip-flop 15 differs from the duration of a pulse from the one-shot multivibrator 18. The output of the exclusive OR gate 23 is applied to a pulse width measuring circuit 24, which measures the time duration of an output from the exclusive OR gate 23. The pulse width measuring circuit 24 may, for example, be an oscilloscope. The output of an exclusive OR gate 23 may also be applied to a transmitter 26 which can transmit a command signal for verification in response to an output from the exclusive OR gate 23.

The end distortion measuring circuit 14 is similar to the front distortion measuring circuit 12. An inverter amplifier 25 is included ahead of the end distortion measuring circuit 14 to invert the negative-going edge of each data pulse to derive a positive-going edge so as to trigger a flip-flop **15*a* and a one-shot multivibrator 18*a*, both of which are similar to the flip-flop 15 and one-shot multivibrator 18 of the front distortion measuring circuit 12. The elements which correspond to the elements in the front distortion measuring circuit 12** are similarly numbered except that a small letter *a* has been added. The output of the flip-flop **15*a* and one-shot multivibrator 18*a* are applied to input terminals 21*a* and 22*a*, respectively, of the exclusive OR gate 23*a*. The end distortion measuring circuit 14 also includes a pulse width measuring circuit 24*a*. The output of the exclusive OR gate 23*a* is also coupled to the transmitter 26. The end distortion measuring circuit 14 is thus responsive to only the lagging edge of a pulse, while the front distortion measuring circuit 12** is only responsive to the leading edge of a data pulse.

Referring now to FIG. 2, the synchronizing circuit 10 and the clock pulse source 11 are shown in greater detail. The synchronizing circuit 10 includes an OR gate 27, having one input terminal 28 connected to the output lead 9 of the decoder 6. The OR gate 27 includes another input terminal 29 connected to a regenerative loop 31. The output of the OR gate 27 is conneceted to a one-shot multivibrator 32, which includes an output terminal 33 connected to an input terminal 34 of an AND gate 35. The AND gate 35 includes a second input terminal 36, connected to the output terminal 7 of the amplifier 5 by way of the conductor 17. The AND gate 35 is connected to the clock pulse source 11 by way of a conductor 38.

The clock pulse source 11 includes an inverter amplifier 39, connected between an AND gate 41 at input terminal 42 and the AND gate 35 by way of the conductor 38. The AND gate 41 normally operates as an inhibit gate for timing pulses generated by an oscillator 43. The timing pulses have a frequency $Nf_m$ where N is an integer and $f_m$ is the frequency of the transmitted bits in each character in the message. The output of the AND gate 41 is applied to a frequency divider 44, which divides the frequency of the timing pulses by a factor of N/2 to derive the clock pulses, as shown by the waveform I in FIG. 3. The clock pulses have a frequency twice the frequency of the transmitted bits in each character, or in other words, the unit time intervals in each character. The frequency of the clock pulses is twice the frequency of the unit time intervals (data pulses and spaces) in each character transmitted. The output of the frequency divider 44 is also applied to a binary counter 46 which counts up to fourteen clock pulses and then enables an AND gate 45. The output of the AND gate 45 is then applied to the input terminal 29 of the OR gate 27 by way of the regenerating loop 31. The output of the AND gate 45 is also applied to the frequency divider 44 and the binary counter 46 through a one-shot multivibrator 47, which delays the output of the AND gate 45 so that the frequency divider 44 and binary counter 46 are reset after the output of the AND gate 45 is applied to the OR gate 27.

Considering the operation of the present invention, it is assumed that it is desired to transmit a message from the transmitter of the sending station, not shown, to the receiver 3. As was previously mentioned, the theoretical message comprises a plurality of characters, each of which consists of 7½ unit time intervals in a time frame containing the data bits. The data bits include the data pulses and spaces in binary form to designate a particular character in the message. The unit time intervals in the theoretical character are of equal time duration. Thus, if a pulse occurs or terminates at a time interval different from a predetermined unit interval, a distortion of the pulse will exist. End distortion, as previously mentioned, may occur at the lagging edge of the data pulse, while front distortion may occur at the leading edge of a data pulse.

Referring to FIGS. 1–3, the start of a message includes a plurality of pulses and spaces in coded form which is generally referred to as a barker code. The barker code is received by the detector and demodulator 4, amplified by the amplifier 5, and decoded in the decoder 6, wherein a sharp barker spike pulse is transmitted along the conductor 9 to the input terminal 28 of the OR gate 27. The sharp spike occurs at time $t_1$, as shown by the waveform A in FIG. 3, and is the output of the decoder 6 along lead 9. The output or the spike barker pulses from the OR gate 27 is applied to the one-shot multivibrator 32, which operates for a given period of time, namely $t_1$ through $t_3$. The output of the one-shot multivibrator 32 at D is shown in the line D of FIG. 3. The AND gate 35 is enabled by the output of the one-shot multivibrator 32. The first transition or the lagging edge of the theoretical signal is gated through the AND gate 35. The output of the and gate 35 is shown as a waveform along line E in FIG. 3 and at point E along conductor 38 in FIG. 2. The output of the AND gate 35 is then applied to an inverter 39 which inhibits the AND gate 41 for a period of time $t_1$ through $t_2$ and allows the output of the oscillator 43 to pass through the AND gate 41 for a period starting at $t_2$ and ends at time $t_8$, thus extending from the time $t_2$ through $t_8$. The oscillator 43 operates at a frequency N times the frequency $f_m$ of the transmitted data bits where N is an integer which may be, for example 100. The output of the oscillator 43 is shown along the waveform G in FIG. 3 and at the point G in the clock pulse source 11 of FIG. 2. The output of the oscillator 43 passes through the AND gate 41 for the time period commencing at $t_2$ and ending at time $t_8$. The output of the AND gate 41 is then applied to the frequency divider 44 which divides the frequency by a factor of $N/2$, as previously mentioned. For example, the frequency of the output of the frequency divider 44 may be $2f_m$. A higher frequency than the transmitted frequency $f_m$ of the data bits is used because it is more accurate to cut off at the higher frequency rather than at the lower frequency, since cutoff occurs at the transition of an edge of a pulse, as is well known in the art. The output of the frequency divider 44 is a train of clock pulses having twice the frequency of the unit intervals in each character, as shown by the waveform I in FIG. 3. The train of clock pulses from the frequency divider 44 is applied to the front distortion measuring circuit 12 and the end distortion measuring circuit 14 by way of the conductor 13.

The train of clock pulses from the frequency divider 44 is also applied to the binary counter 46, which counts up to a count of fourteen pulses in the train and enables AND gate 45. At a count of fourteen pulses, the AND gate 45 has an output which is applied to the OR gate 27 at input terminal 29 by way of the regenerative loop 31. The output of the AND gate 45 and the OR gate 29 is another sharp spike pulse similar to the barker spike pulse, as shown along line C of FIG. 3, but is reoccurring by a regenerative action for each character. The output of the AND gate 45 is also applied to the delay device 47 which delays the sharp spike pulses as shown along the line C of FIG. 3. The output of the delay device 47 is applied to the frequency divider 44 and the binary counter 46 to reset the frequency divider 44 and the binary counter 46. Thus, as just described, a train of clock pulses having a frequency twice the frequency of the unit intervals in each of the theoretical characters is generated for each character. In other words, the clock pulses have a frequency twice the frequency of the binary data bits, that is the data pulses and spaces which occur in binary form.

Figure 4:
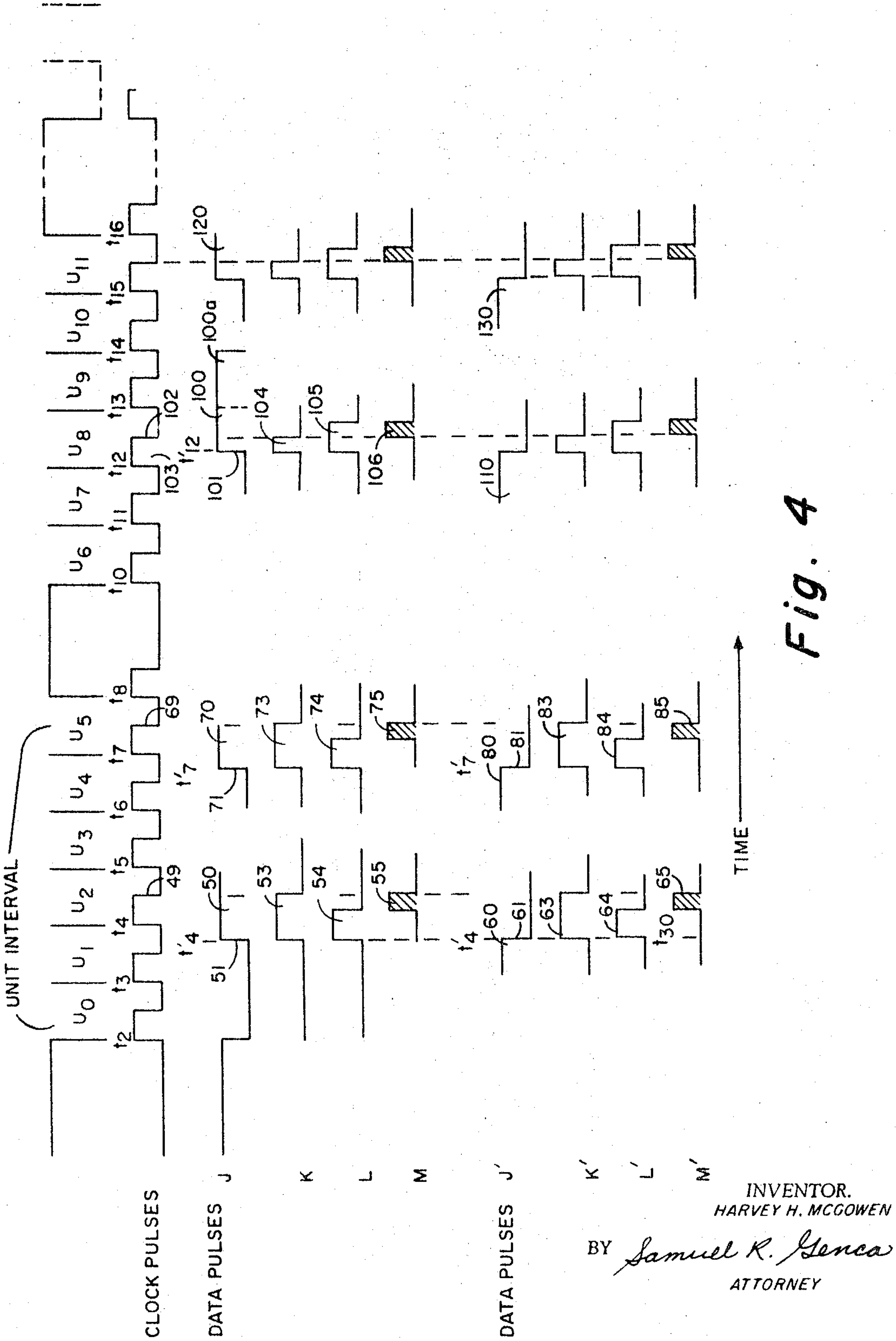
FIG. 4 shows wave shapes of data pulses having front distortion and end distortion occurring at various time intervals.

Referring now to FIGS. 3 and 4, eight different possible front and end timing distortions of different data pulses and the operation of the test apparatus in accordance with the invention are illustrated. In FIG. 4, front distortion is shown along the leading edge 51 of a data pulse 50 along line I. The leading edge 51 occurs at time $t_4'$ instead of time $t_4$. It should be noted that if the leading edge 51 occurred at time $t_4$, no distortion would exist along the leading edge 51 of the pulse 50. To detect this front distortion, the pulse 50 is applied to the flip-flop 15 and to the one-shot multivibrator 18 of the front distortion measuring circuit 12 along conductor 17 from the receiver 3. The flip-flop 15 is triggered on the leading positive-going edge 51 of the pulse 50 and is reset on the trailing edge 49, next succeeding the edge 51 of the pulse 50 to generate a transitional pulse 53. The transitional pulse 53 is shown along line K of FIG. 4. The one-shot mutlivibrator 18 in response to the positive-going edge 51, generates a reference pulse 54 which has a time duration equal to the time duration of the clock pulse 52 and commencing at the $t_4'$. The reference pulse is shown along line L of FIG. 4. The transitional pulse 53 and the reference pulse 54 are simultaneously applied to the input terminals 21 and 22 respectively of the exclusive OR gate 23 at time $t_4'$. The exclusive OR gate 23 derives a distortional pulse 55, having a pulse width equal to the difference in the time duration or width of the transitional pulse 53 and the reference pulse 54. The distortional pulse is shown along line M of FIG. 4. The distortional pulse 55 is applied to the pulse width measuring circuit 24 which measures the time duration of the distortional pulse 55. The distortional pulse 55 may also be applied to the transmitter 26 which transmits a coded message to the originating transmitting station, requesting verification of the message transmitted. The verification is required because distortion exists along the leading edge of the pulse 50 and an ambiguity may exist in the charatcer of the message. It should be noted that if the transitional pulse 53 and reference pulse 54 are of equal duration, there will be no output from the exclusive OR gate 23, indicating that there is no front distortion on the transmitted pulse 50.

Referring again to FIG. 4, another data pulse 60 along J' is shown as having end distortion on a negative-going lagging edge 61. The lagging edge 61 of the pulse 60 actually occurs at a time $t_4'$ instead of a time $t_4$. The negative-going lagging edge 61 of the pulse 60 is applied to the inverter 25, which inverts the negative-going lagging edge 61 of a pulse 60 to a positive-going edge and triggers the flip-flop 15*a* and the one-shot multivibrator 18*a*. The flip-flop 15 and one-shot multivibrator 18 of the front distortion measuring circuit 12 remain at rest since they are not triggered by a negative-going edge of the pulse 60. The flip-flop 15*a* is reset by the trailing edge 49 of the clock pulse 52 next succeeding the edge 61 of the pulse 60 to generate a transitional pulse commencing at time $t_4'$. The transitional pulse is shown along line K'. The one-shot multivibrator 18*a* generates a reference pulse 64 which has a pulse duration equal to the duration of the clock pulse 52 and commencing at time $t_4'$. The reference pulse is shown along line L'. The output of the flip-flop 15*a* and the one-shot multivibrator 18*a* are applied simultaneously at the time $t_4'$ to the exclusive OR gate 23*a* which derives a distortional pulse indicative of the end distortion along the lagging edge 61 of the data pulse 60 in accordance with the invention. The distortional pulse is shown along line M'.

Another example of front distortion of a data pulse is shown along the leading edge 71 of a data pulse 70 along line J of FIG. 4. The data pulse 70 is applied to the flip-flop 15 and the one-shot multivibrator 18 of the front distortion measuring circuit 12 and to the inverter 25. The flip-flop 15 is triggered by the positive-going edge 71 of the data pulse 70 at time $t_7'$ and is reset by the trailing edge 69 of the clock pulse 72 next succeeding the positive-going or leading edge 71 of the data pulse 70. The one-shot multivibrator 18 is triggered by the positive-going leading edge 71 of the data pulse 70 at time $t_7'$ to generate a reference pulse 74. The transitional pulse 73 and the reference pulse 74 are applied simultaneously to the exclusive OR gate 23 which derives a distortional pulse 75 having a pulse width equal to the front distortion along the leading edge 71 of the data pulse 70.

In a similar manner, end distortion of a data pulse 80 occurring along the negative-going lagging edge 81 may also be detected and measured in a manner as previously described. The negative-going lagging edge 81 is converted into a positive-going edge 81 by the inverter 25. The positive-going edge 81 of the data pulse 80 triggers the flip-flop 15*a* and the one-shot multivibrator 18*a* at time $t_7'$. The flip-flop 15 is reset by the lagging edge 69 of the clock pulse 72 next succeeding the lagging edge 81 of the data pulse 80. The one-shot multivibrator 18*a* generates a reference pulse 84, having a pulse width equal to the width of the clock pulse 72 and commencing at time $t_7'$. The transitional pulse 83 and the reference pulse 84 are applied simultaneously to the exclusive OR gate 23, which has an output as long as the pulse width of the transitional pulse differs from the pulse width of the reference pulse. The output of the exclusive OR gate 23 is a distortional pulse 85 signifying end distortion.

The remaining data pulses, namely data pulses 100, 110, 120 and 130 illustrate examples of front and end distortion similar to that just described for the data pulses 50, 60, 70 and 80. It should be noted that the edge of the data pulse along which distortion occurs is the edge that triggers the flip-flops 15 and 15$a$ in the front and end distortion circuits 12 and 14 respectively, and is also the edge which triggers the one-shot multivibrators 18 and 18$a$ in the front and end distortion circuits 12 and 14 respectively. The flip-flops 15 and 15$a$ are reset by the trailing edge of the clock pulse next succeeding the edge of the data pulse under test.

In FIG. 4, two data pulses, 100 and 100$a$, are shown as extending through two unit time intervals. Prior art phase meters are not particularly suited for measuring distortion along the leading and lagging edges of adjacent binary data pulses, since the pulses are not periodical in form. The positive-going leading edge 101 of the data pulse 100 triggers the one-shot multivibrator 18 and the flip-flop 15 at time $t_{12}'$ The flip-flop 15 generates the transitional pulse 104 which has a pulse duration commencing at the time $t_{12}'$ and ending at the same time that the edge 102 of the clock pulse 103 occurs. The one-shot multivibrator 18 generates a reference pulse 105 having a pulse duration equal to the duration of the clock pulse 103 and commencing at time $t_{12}'$. The transitional pulse 104 and the reference pulse 105 are applied to the exclusive OR gate 23 which derives the distortional pulse 106. The distortional pulse 106 has a time duration equal to the difference between the time duration of the transitional pulse 104 and the reference pulse 105. The pulse 100$a$ adjacent to the pulse 100 does not trigger the flip-flop 15 and the one-shot multivibrator 18, because no transition takes place between the pulses 100 and 100$a$. In other words, no distortions occur between the pulses 100 and 100$a$. Since the flip-flop 15 and the one-shot multivibrator 18 are not set or triggered, they remain in the same state, and thus no output pulses are applied to the exclusive OR gate 23.

The remaining wave shape forms of data pulses in FIG. 4 graphically illustrate the time sequence of the leading and lagging edges of the data pulses and the genertion of the transitional pulses and the reference pulses wherein if a difference occurs in the time duration of the transitional pulses and the reference pulses, a distortional pulse will be derived from the exclusive OR gates 23 and 23$a$.

Although a preferred embodiment of the invention has been disclosed, it is realized that modifications can be made therein without departing from the disclosed invention. For instance, the characters may comprise different unit intervals, such as fifteen unit time intervals and include more bits of information consisting of binary data pulses and spaces. The synchronizing circuits 10 and the clock pulse source 11 are shown by way of example only and may be any of the types which synchronize the clock pulses with the start of any one character in a given message.

What is claimed is:

1. In a data communication system wherein a plurality of data pulses are transmitted with uniform pulse spacing and width, a system for detecting timing distortion comprising:

(a) means for providing a plurality of clock pulses for each plurality of said data pulses synchronously with at least one of said data pulses, said clock pulses having a width equal to half the width of said transmitted data pulses, (b) first means responsive to each of said data pulses and said clock pulses for deriving a first pulse having a width equal to the time interval between one of the edges of each of said data pulses and trailing edge of the clock pulse next succeeding said one edge of each of said data pulses, (c) second means responsive to said one edge of each of said data pulses for deriving a second pulse commencing at the time of occurrance of said one edge and having a width equal to the time interval of said clock pulses, and (d) an exclusive OR gate responsive to said first and second pulses for deriving an output indicative of said distortion.

2. The invention defined in claim 1, wherein said one edge is the leading edge of each of said data pulses.

3. The invention defined in claim 1, wherein said one edge is the lagging edge of each of said data pulses.

4. The invention defined in claim 1, wherein said first means is a flip-flop.

5. The invention defined in claim 1, wherein said second means is a one-shot multivibrator.

6. The invention defined in claim 1, further including a receiver connected to said first and second means for detecting said data pulses.

7. The invention defined in claim 1, wherein said first-named means further includes a detector responsive to a given one of said data pulses.

8. The invention as set forth in claim 1 further comprising an inverter circuit for inverting said data pulses, third means responsive to each of said inverted data pulses and said clock pulses for deriving a third pulse having a width equal to the time interval between one of the edges of each of said inverted data pulses and the trailing edge of the clock pulse next succeeding said one edge of each of said inverted data pulses, and fourth means responsive to said one edge of each of said inverted data pulses for deriving a fourth pulse commencing at the time of occurrence of said one edge of each of said inverted data pulses and having a width equal to the time interval of said clock pulses.

References Cited

UNITED STATES PATENTS

| | | | |
|---|---|---|---|
| 2,929,875 | 3/1960 | Boughtwood et al. | 328—162 XR |
| 3,059,179 | 10/1962 | Heaton. | |
| 3,205,438 | 9/1965 | Buck. | |
| 3,325,730 | 6/1967 | Des Brisay. | |

JOHN S. HEYMAN, Primary Examiner

S. T. KRAWCZEWICZ, Assistant Examiner

U.S. Cl. X.R.

324—68; 328—155